United States Patent [19]
Chambers, Jr.
[11] 3,815,041
[45] June 4, 1974

[54] AMPLIFIER CIRCUIT HAVING A MULTIPLICITY OF DISCRETE OPERATIVE STATES

[75] Inventor: Charles W. Chambers, Jr., Amherst, Ohio
[73] Assignee: Lorain Products Corporation, Lorain, Ohio

[22] Filed: June 14, 1972
[21] Appl. No.: 262,642
[52] U.S. Cl. ............... 330/207 A, 330/35, 330/185, 330/24
[51] Int. Cl. ............... H03f 21/00
[58] Field of Search ............... 330/207 A, 51, 35; 318/458

[56] References Cited
UNITED STATES PATENTS 3,437,944 4/1969 Camenzind ............... 330/207 A

*Primary Examiner*—Nathan Kaufman
*Attorney, Agent, or Firm*—Edward C. Jason

[57] ABSTRACT

A controllable amplifier (or attenuator) having a plurality of operative states. In a first state, an amplifier control network energizes an amplifier in accordance with an input signal and a first gain control network to produce an output signal which is in phase with the input signal. In a second state, the amplifier control network energizes the amplifier in accordance with the input signal and a second gain control network to produce an output signal which is substantially 180° out of phase with the input signal. In a third or non-amplifying state, the amplifier control network prevents the generation of an output signal. The amplifier control network is adapted to be controlled by an externally generated control signal such as a signal indicating the dominant direction of voice transmission in a transmission line.

6 Claims, 2 Drawing Figures

AMPLIFIER CIRCUIT HAVING A MULTIPLICITY OF DISCRETE OPERATIVE STATES

BACKGROUND OF THE INVENTION

The present invention relates to amplifier and attenuator circuits and is directed more particularly to circuits of these types which have a plurality of operative states each characterized by a predetermined gain and by a predetermined input-output phase angle.

Under circumstances where signals being transmitted through a transmission line are to be amplified by an amplifier located between the ends of that line, transmission difficulties arise as a result of the distributed inductance, capacitance and resistance of the conductors. The impedance of the transmission line, for example, varies as a function of position along the line and as a function of signal frequency. The impedance of the line may also depend upon whether the impedance measurement is made in one or the other direction along the line.

The problem with the above impedance characteristic is that the failure to match the impedance of the line to the impedance of an amplifier such as a repeater which is connected thereto gives rise to signal reflections. These reflections may cause an amplifier to amplify the echo of earlier transmitted signals and thereby initiate oscillations which prevent normal signal transmission.

One highly effective method of solving the above problems is to provide an amplifier of the type described in my copending U.S. Pat. application Ser. No. 157,471. The circuit of the present invention is directed to improved controlled amplifier circuitry adapted for use in amplifiers of the type shown in the above application. The present invention enables such amplifiers to operate in transmission lines which transmit most effectively in the presence of an amplifier having one set of electrical characteristics during the amplification of signals transmitted in one direction and another set of electrical characteristics during the amplification of signals transmitted in the other direction.

SUMMARY OF THE INVENTION

It is an object of the invention to provide an improved controlled amplifier network suitable for use in amplifier circuits having directional switching characteristics.

Another object of the invention is to provide an amplifier network having a plurality of operative states each of which is characterized by a predetermined magnitude of gain (or attenuation) and a predetermined phase angle.

Yet another object of the invention is to provide a controlled amplifier having a plurality of gain control networks and a plurality of controllable conducting devices for coupling the gain control networks and an input signal to an amplifier to alter the electrical characteristics thereof.

It is another object of the invention to provide circuitry of the above character having a quiescent or non-amplifying state.

Still another object of the invention is to provide amplifier circuitry the operative state of which can be changed rapidly in accordance with an externally generated control signal.

DESCRIPTION OF THE INVENTION

Figure 1:
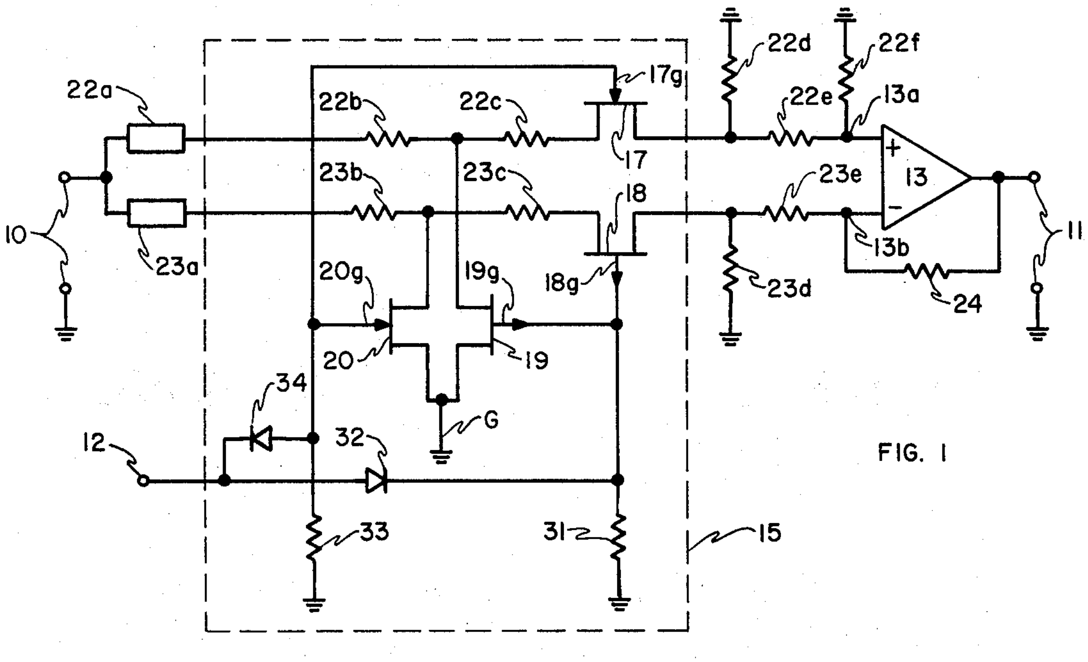
FIG. 1 is a schematic diagram of one exemplary circuit embodying the invention, an FIG. 2 is a schematic diagram of a second exemplary circuit embodying the invention.

Referring to FIG. 1 there is shown a controllable amplifier network having signal input terminals 10, signal output terminals 11 and a control terminal 12. The latter network includes an amplifier 13 which may comprise an operational amplifier in integrated circuit form and a control network 15 including a plurality of controllable conducting means which here takes the form of N-channel junction field-effect transistors 17 and 20 and P-channel junction field-effect transistors 18 and 19. The controllable amplifier of FIG. 1 also includes a first gain control network including an impedance **22*a*, resistors 22*b*, 22*c*, 22*d*, 22*e*, 22*f* and 24 and a second gain control network including an impedance 23*a*, resistors 23*b*, 23*c*, 23*d*, 23*e* and 24.**

As will be described more fully presently, control network 15 causes amplifier 13 to operate in one of a plurality of operative states in accordance with the potential of control terminal 12. When, for example, a positive control potential appears at terminal 12, control network 15 causes amplifier 13 to operate in a first or phase-maintaining operative state to produce an output signal at terminal 11 which is in phase with the input signal at terminal 10 and which has a magnitude determined by the first gain control network. When, on the other hand, a negative control potential appears at control terminal 12, control network 15 causes amplifier 13 to operate in a second or phase-reversing operative state to produce an output signal at terminal 11 which is substantially 180° out of phase with the input signal at terminal 10 and which has a magnitude determined by the second gain control network. Finally, when the potential at control terminal 12 is at or near zero, network 15 causes amplifier 13 to operate in a third or non-amplifying state to produce substantially no signal voltage at output 11.

To the end that control network 15 may establish the above described first operative state, the power leads of transistor 17 are connected in series between input 10 and non-inverting or phase-maintaining amplifier input **13*a* through the circuit elements of the first gain control network, and the power leads of transistor 20 are connected between ground and resistors 23*b* and 23*c*. Transistor 17 serves as a series control device which, when conducting, energizes amplifier 13 in accordance with the input signal and the first gain control network. Transistor 20, serves as a shunt control device which, when conducting, directs the input signal to ground G rather than to amplifier input 13*b*. Thus, when only transistors 17 and 20 conduct, amplifier 13 is affected only by the first gain control network and the circuit of FIG. 1** assumes its first operative state.

Similarly, to the end that control network 15 may establish the above described second operative state, the power leads of transistor 18 are connected between input 10 and inverting or phase-reversing amplifier input **13*b* through the circuit elements of the second gain control network and the power leads of transistor 19 are connected between ground G and resistors 22*b* and 22*c*. Transisotr 18 serves as a series control device which, when conducting, energizes amplifier 13 in accordance with the input signal and the second gain control network. Transistor 19 serves as a shunt control device which, when conducting, directs the input signal to ground G rather than to amplifier input 13***a*. Thus, when only transistors 18 and 19 conduct, amplifier 13 is affected only by the second gain control network and the circuit of FIG. 1 assumes in its second operative state.

To the end that control network 15 may establish the above described third operative state, the power leads of transistors 19 and 20 are connected between ground G and resistor pairs 22*b* and 22*c* and 23*b* and 23*c*, respectively. Each of these transistors serves as a shunt control device to direct current away from the amplifier input to which it is connected, and thereby prevent that input from influencing the voltage at output 11. Thus, when transistors 19 and 20 conduct simultaneously, amplifier 13 is prevented from producing any signal at output 11 and the circuit of FIG. 1 assumes its third operative state.

In view of the foregoing, it will be seen that transistors 17 and 20 serve as first controllable conducting means to establish a first or phase-maintaining operative state in the amplifier of FIG. 1, that transistors 18 and 19 serve as second controllable conducting means to establish a second or phase-reversing state of the amplifier of FIG. 1, and that transistors 19 and 20 serve as third controllable conducting means to establish a third or non-amplifying state in the amplifier of FIG. 1.

To the end that transistors 17, 18, 19 and 20 may be controlled in accordance with the control potential at control terminal 12, the gate leads 18*g* and 19*g* of transistors 18 and 19, respectively, are connected to ground through a resistor 31 and to control terminal 12 through a diode 32, and the gate leads 17*g* and 20*g* of transistors 17 and 20, respectively, are connected to ground through a resistor 33 and to terminal 12 through a diode 34. Resistors 31 and 33 apply ground potential to the gate leads of transistors 17, 18, 19 and 20 to maintain conduction therethrough so long as the voltage between control terminal 12 and ground is insufficient to render either diode 32 or diode 34 conducting in the forward direction. This conduction, in turn, causes any signal voltage at input 10 to be directed to ground and away from inputs 13*a* and 13*b* of amplifier 13. Thus, when control terminal 12 is at or near ground potential, the circuit of FIG. 1 assumes its third or non-amplifying state and amplifier 13 establishes no signal voltage at output 11.

When the potential at terminal 12 is positive and is sufficient to render diode 32 conducting, current flows through resistor 31 and establishes a positive voltage at gates 18*g* and 19*g* of transistors 18 and 19. At the same time gates 17*g* and 20*g* of transistors 17 and 20 are held at ground potential as a result of the non-conduction of diode 34. Under these conditions, transistors 18 and 19 turn off but transistors 17 and 20 do not turn off, causing amplifier 13 to operate in its first or phase-maintaining state. Thus, when the potential at control terminal 12 is positive from ground by a voltage in excess of the forward breakdown voltage of diode 32, the circuit of FIG. 1 is in its first operative state.

Similarly, when the potential at control terminal 12 is negative from ground and is sufficient to render diode 34 conducting, current flows through resistor 33 and establishes a negative potential at the gates 17*g* and 20*g* of transistors 17 and 20. At the same time, the gates of transistors 18 and 19 are held at ground potential as a result of the non-conduction of diode 32. Under these conditions, transistors 17 and 20 turn off and transistors 18 and 19 do not turn off, causing amplifier 13 to operate in its second or phase-reversing operative state. Thus, when the potential at control terminal 12 is negative from ground by a voltage in excess of the forward breakdown voltage of diode 34, the circuit of FIG. 1 is in its second or phase-reversing operative state.

It will be understood that impedances 22*a* and 23*a* may comprise resistances of differing value, each value being selected to accommodate a particular circuit condition. Impedance 22*a*, for example, may cause amplifier 13 to operate at the gain required for the desired quality of amplification of signals transmitted in one direction in a transmission line while impedance 23*a* may cause amplifier 13 to operate at the gain required for the desired quality of amplification of signals transmitted in the other direction. Furthermore, it has been found that impedances 22*a* and 23*a* may be made inductive or capacitive to impart to the circuit of FIG. 1 a first gain-frequency characteristic for operation in the first operative state and a second gain-frequency characteristic for operation in the second operative state.

It will be understood that in the event that the circuit of the invention is to be used as an attenuator, this may be accomplished by simply selecting values for the circuit elements of the gain control networks such that the gain provided by amplifier 13 is less than one.

Figure 2:
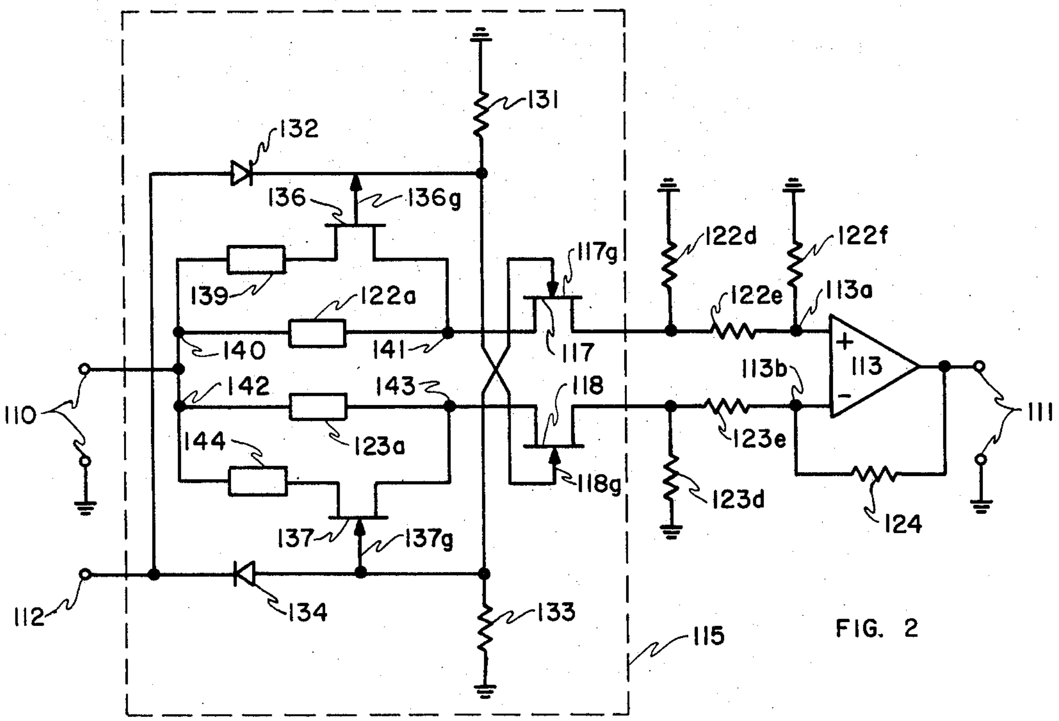

Another circuit adapted to provide amplification in the above described first, second and third operative states is shown in FIG. 2. FIG. 2 shows circuitry which is in many respects similar to the circuit of FIG. 1 and like functioning parts are similarly numbered except that the prefix 1 is used in FIG. 2.

The circuit of FIG. 2 differs from the circuit of FIG. 1 principally in the manner in which the third or non-amplifying state is established. More specifically, the circuit of FIG. 2 establishes its non-amplifying state by applying equal signal voltages in cancelling relationship to amplifier inputs 113*a* and 113*b*, rather than by directing the input signal away from those inputs as does the circuit of FIG. 1.

The operation of the circuit of FIG. 2 will now be described. When a positive control potential of sufficient magnitude appears at control terminal 112, diode 132 conducts through resistor 131 to establish a positive potential at the gates 136*g* and 118*g* of transistors 118 and 136, causing these devices to turn off. At the same time, ground potential is applied through resistor 133 to gates 137*g* and 117*g* of transistors 137 and 117 causing these devices to conduct. Under these conditions, transistors 117 energizes non-inverting amplifier input 113*a* in accordance with the signal voltage at input 110 and in accordance with circuit elements 122*a*, 122*d*, 122*e*, 122*f* and 124 which serve as first gain control means. This is the first or phase-maintaining amplifying state of the circuit of FIG. 2.

Similarly, when a negative control potential of sufficient magnitude appears at terminal 112, diode 134 conducts through resistor 133 to establish a negative potential at gates 137*g* and 117*g* of transistors 137 and 117, causing these devices to turn off. At the same time ground potential is applied through resistor 131 to gates 118*g* and 136*g* of transistors 118 and 136, causing these devices to conduct. Under these conditions, transistor 118 energizes inverting amplifier input 113*b* in accordance with the signal voltage at input 110 and in accordance with circuit elements 123*a*, 123*d*, 123*e* and 124 which serve as second gain control means. This is the second or phase-reversing amplifying state of the circuit of FIG. 2.

When the potential at control terminal 112 is insufficient to establish conduction through either diode 132 or diode 134, that is, when terminal 112 is at or near ground potential, gates 136*g* and 118*g* of transistors 136 and 118, respectively, are held at ground potential by resistor 131 and gates 137*g* and 117*g* of transistors 137 and 117, respectively, are held at ground potential by resistor 133. Under these conditions, transistors 117, 118, 136 and 137 conduct simultaneously thus applying signal voltages to both inputs 113*a* and 113*b* of amplifier 113.

If, under the above conditions, the impedance of an equalizing impedance 139, acting through transistor 136 to assume a parallel relationship to gain control impedance 122*a*, establishes between junctions 140 and 141 the same impedance which equalizing impedance means 140, acting through transistor 137 to assume a parallel relationship to gain control impedance 123*a*, establishes between junctions 142 and 143, the signal voltages applied to inputs 113*a* and 113*b* of amplifier 113 will be equal. Under these conditions, the tendency of amplifier 113 to produce an in-phase output signal is cancelled by its tendency to produce an out-of-phase output signal with the result that amplifier 113 will produce no net output voltage. Thus, the application of ground potential at control terminal 112 causes the circuit of FIG. 2 to assume its third or non-amplifying state.

Thus, transistor 117 serves as first controllable conducting means for energizing amplifier 113 in accordance with an input signal and in accordance with a first gain control network. Also, transistor 118 serves as second controllable conducting means for energizing amplifier 113 in accordance with an input signal and a second gain control network. Transistors 117, 118, 136 and 137 serve as third controllable conducting means to assure that amplifier 113 does not establish an amplified signal voltage in spite of the presence of a signal voltage at input 110 and in spite of the first and second gain control networks.

In view of the foregoing, it will be seen that the invention comprises amplifier circuitry having a plurality of operative states, each of which has a predetermined gain and a predetermined phase shift and each of which can be established or terminated in response to an externally generated control signal.

It will be understood that the embodiments shown herein are for descriptive purposes only and may be changed or modified without departing from the spirit and scope of the appended claims.

What is claimed:

1. In a controlled amplifier, in combination, signal input means, signal output means, control terminal means, amplifying means having input means and output means, said amplifying means having a first operative state in which the signal at said amplifier output means is in phase with the signal at said amplifier input means, a second operative state in which the signal at said amplifier output means is substantially 180° out of phase with the signal at said amplifier input means, and a third operative state in which substantially no signal appears at said amplifier output means, first and second gain control means for establishing respective first and second gains for said amplifying means when said amplifying means is in its respective first and second operative states, first controllable conducting means for connecting said signal input means and said first gain control means to said amplifying means, second controllable conducting means for connecting said signal input means and said second gain control means to said amplifying means, third controllable conducting means connected to said signal input means and to said amplifying means for preventing the signal at said signal input means from affecting the voltage at said amplifier output means, means for connecting said control terminal means to said first controllable conducting means to control the conduction thereof so as to establish said first operative state when a control signal of a first character appears at said control terminal means, means for connecting said control terminal means to said second controllable conducting means to control the conduction thereof so as to establish said second operative state when a control signal of a second character appears at said control terminal means, means for connecting said control terminal means to said third controllable conducting means to control the conduction thereof so as to establish said third operative state when a control signal of a third character appears at said control terminal means and means for connecting the output means of said amplifying means to said signal output means.

2. In a controlled amplifier, in combination, signal input means, signal output means, control terminal means, amplifying means having non-inverting input means, inverting input means and output means, said amplifying means having a first operative state in which the potential of said amplifier output means varies in accordance with the potential of said non-inverting input means, a second operative state in which the potential of said amplifier output varies in accordance with the potential of said inverting input means, and a third operative state in which the potential of said amplifier output means is maintained at a quiescent value, first and second gain control means for establishing respective first and second values of gain in said amplifying means when said amplifying means is in its respective first and second operative states, first controllable conducting means for connecting said signal input means and said first gain control means to said non-inverting input means, second controllable conducting means for connecting said signal input means and said second gain control means to said inverting input means, third controllable conducting means connected to said signal input means and to both input means of said amplifying means, means for connecting said control terminal means to said first and second controllable conducting means, respectively, to control the conduction thereof so as to establish said first and second operative states, respectively, when the potential of said control terminal means is within respective first and second voltage ranges, means for connecting said control terminal means to said third controllable conducting means to control the conduction thereof so as to establish said third operative state when the potential of said control terminal means is not within said first and second voltage ranges, and means for connecting said amplifier output means to said signal output means.

3. In a controlled amplifier, in combination, signal input means, signal output means, control terminal means, amplifying means having input means and output means, said amplifying means having a first operative state in which signal variations at said amplifier output means are in phase with signal variations at said amplifier input means, a second operative state in which signal variations at said amplifier output means are substantially 180° out of phase with signal variations at said amplifier input means and a third state in which substantially no signal variations appear at said amplifier output means, first and second gain control means for establishing respective first and second values of gain in said amplifying means when said amplifying means is in its respective first and second operative states, first controllable conducting means for connecting said signal input means and said first gain control means to the input means of said amplifying means, second controllable conducting means for connecting said signal input means and said second gain control means to the input means of said amplifying means, third controllable conducting means connected to said signal input means and to the input means of said amplifying means for directing signal variations at said signal input means away from the input means of said amplifying means, means for connecting said control terminal means to said first controllable conducting means to control the conduction thereof so as to establish said first operative state when the potential of said control terminal means has a first value, means for connecting said control terminal means to said second controllable conducting means to control the conduction thereof so as to establish said second operative state when the potential of said control terminal means has a second value, means for connecting said control terminal means to said third controllable conducting means to control the conduction thereof so as to establish said third operative state when the potential of said control terminal means has a third value, and means for connecting the output means of said amplifying means to said signal output means.

4. In a controlled amplifier, in combination, signal input means, signal output means, control terminal means, amplifying means having input means and output means, said amplifying means having a first operative state in which signal variations at said amplifier output means are in phase with signal variations at said amplifier input means, a second operative state in which signal variations at said amplifier output means are substantially out of phase with signal variations at said amplifier input means and a third state in which substantially no signal variations occur at said amplifier output means, first and second gain control means for establishing respective first and second values of gain in said amplifying means when said amplifying means is in its respective first and second operative states, first controllable conducting means for connecting said signal input means and said first gain control means to the input means of said amplifying means, second controllable conducting means for connecting said signal input means and said second gain control means to the input means of said amplifying means, third controllable conducting means connected to said signal input and to the input means of said amplifying means to apply mutually cancelling signal variations to said amplifying means, means for connecting said control terminal means to said first controllable conducting means to control the conduction thereof so as to establish said first operative state when the potential of said control terminal means has a first value, means for connecting said control terminal means to said second controllable conducting means to control the conduction thereof so as to establish said second operative state when the potential of said control terminal means has a second value, means for connecting said control terminal means to said third controllable conducting means to control the conduction thereof so as to establish said third operative state when the potential of said control terminal means has a third value, and means for connecting the output means of said amplifying means to said signal output means.

5. In a controlled amplifier, in combination, signal input means, signal output means, control terminal means, amplifying means having non-inverting input means, inverting input means and output means, first and second gain control means for establishing respective first and second values of gain for signals applied, respectively, to the non-inverting and inverting input means of said amplifying means, first series conducting means for connecting said signal input means to said non-inverting input means through said first gain control means, second series conducting means for connecting said signal input means to said inverting input means through said second gain control means, first shunt conducting means connected to said signal input means and to said inverting input means for applying a disabling potential to said inverting input means, second shunt conducting means connected to said signal input means and to said non-inverting input means for applying a disabling potential to said non-inverting input means, means for connecting said control terminal means to said first and second series conducting means, respectively, to control the conduction thereof so as to connect said signal input means to said non-inverting and inverting input means, respectively, when the potential of said control terminal means is within respective first and second ranges of electrical potential, means for connecting said control terminal means to said first and second shunt conducting means to control the conduction thereof so as to effectively disconnect said signal input means from the input means of said amplifying means when the potential of said control terminal means is not within said first and second ranges of electrical potential and means for connecting the output means of said amplifying means to said signal output means.

6. In a controlled amplifier, in combination, signal input means, signal output means, control terminal means, amplifying means having non-inverting input means, inverting input means and output means, first and second gain control impedances of differing electrical values for establishing respective first and second values of gain for signals applied, respectively, to the non-inverting and inverting input means of said amplifying means, first and second equalizing impedances, first series conducting means for connecting said signal input means to said non-inverting input means through said first gain control impedance, second series conducting means for connecting said signal input means to said inverting input means through said second gain control impedance, first paralleling means for connecting said first equalizing impedance in parallel with said first gain control impedance to establish a predetermined impedance, second paralleling means for connecting said second equalizing impedance in parallel with said second gain control impedance to establish said predetermined impedance, means for connecting said control terminal means to said first series conducting means to control the conduction thereof so as to connect said signal input means to said non-inverting input means when the potential of said control terminal means is within a first range of electrical potential, means for connecting said control terminal means to said second series conducting means to control the conduction thereof so as to connect said signal input means to said inverting input means when the potential of said control terminal means is within a second range of electrical potential, means for connecting said control terminal means to said first and second series conducting means and to said first and second paralleling means to afford conduction therethrough when the potential of said control terminal means is not within said first and second ranges of electrical potential and means for connecting the output means of said amplifying means to said signal output means.

* * * * *